Oct. 26, 1965  J. B. L. CHRISTIAN ETAL  3,213,507
STUD AND SOCKET FASTENER
Filed June 14, 1963

INVENTOR
JAMES BERTIE LEONARD CHRISTIAN &
ARTHUR STANLEY PEARSON,
BY Walter P. Jones
ATTORNEY 3,213,507
STUD AND SOCKET FASTENER
James Bertie Leonard Christian, Loughborough, and Arthur Stanley Pearson, Sherwood, Nottingham, England, assignors to United-Carr Incorporated, a corporation of Delaware
Filed June 14, 1963, Ser. No. 287,865
Claims priority, application Great Britain, June 18, 1962, 23,367/62
1 Claim. (Cl. 24—217)

This invention relates to a stud and socket fastener.

According to the present invention, a stud or socket element of a stud and socket fastener is formed of synthetic plastics material and comprises a base having a stud or socket portion extending integrally from one face, a retainer ring also formed of resilient synthetic plastics material being provided for securing the element to a support, the element being adapted to be assembled with a support by inserting the stud or socket portion through a hole in the support so that the base abuts one face thereof and the stud or socket portion projects from the opposite face where it is secured by snapping the retainer ring over the stud or socket portion.

The dimensions of the retainer ring are such that when snapped into position it engages the root of the stud or socket and abuts the said opposite face of the support, leaving a sufficient portion of the stud or socket projecting outwardly for co-operative engagement with the other element of the fastener.

Both elements of the fastener may be formed of synthetic plastics material, and each may be secured to the support by a retainer ring as mentioned above.

Figure 1:
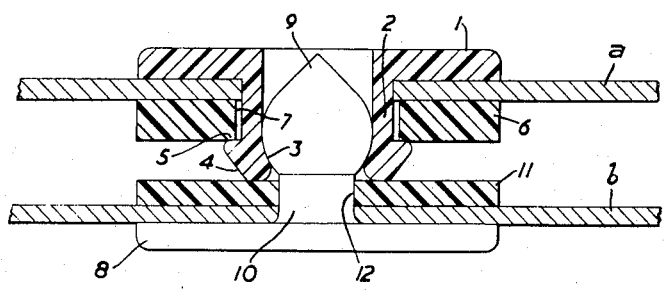
Figure 2:
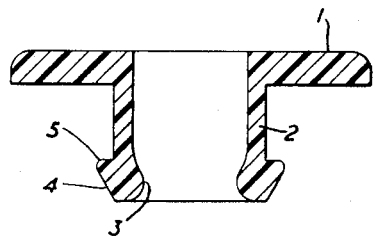

To enable the invention to be fully understood, it will now be described, by way of example, with reference to the accompanying drawings in which:

FIGURE 1 is a sectional view of a stud and socket fastener according to one embodiment of the invention; and FIGURE 2 is a sectional view of the socket element.

As shown in the drawings, the socket element is formed of synthetic plastics material and comprises a flat base 1, having an integral annular flexible wall 2 projecting from one face so as to define a socket portion, the bore of which extends through the base. Adjacent its free end the wall is formed with an annular internally projecting bead 3 and an externally tapered edge 4, leading to an annular shoulder 5.

As more particularly illustrated in FIGURE 1, the wall 2 which forms the stud receiving socket portion is inserted through a hole in the support $a$ so that the base abuts the outer face of the support and the socket portion projects from the opposite face. The socket element is secured by a retainer ring 6 made of synthetic plastics material and formed with a central aperture 7. The ring is assembled by presenting the tapered edge 4 to the aperture and forcing the ring axially over the edge until it snaps under the shoulder 5 whereby the ring abuts the adjacent face of the support. It will be understood that the wall 2 will be sufficiently resilient to permit the retainer ring to be snapped into retaining position wherein it surrounds the socket, leaving a sufficient portion of the wall of the latter free for co-operative engagement with the stud element of the fastener. The stud element which is also made of synthetic plastics material comprises a flat base 8, having a stud head 9 integrally connected to one face by a neck 10. The stud element is secured to a support $b$ by a retainer ring 11 made of resilient synthetic plastics material and formed with a central aperture 12. To assemble the stud element, the stud head 9 is inserted through a hole in the support so that the base 8 abuts the outer face of the support, and the head 9 projects from the opposite face. The retainer ring 11 is snapped over the head 9 so as to abut the said opposite face of the support and resiliently engage the neck 10.

The supports $a$ and $b$ may comprise flexible sheets of textile or other suitable material, and in use, the head 9 is inserted axially into the socket cavity of the socket element so that the bead 3 resiliently engages the reduced diameter of the head adjacent the neck 10.

We claim:

An installation comprising two apertured panels spaced from each other and a snap fastener securing said panels in spaced relationship one to the other, said snap fastener formed of a synthetic plastic material including a socket assembly having a head section at one end thereof overlying a surface of one of said panels, an integral tubular portion extending through the aperture in one of said panels and a retainer ring, having an engagement aperture, said tubular portion extending through said engagement aperture, an external shoulder extending from said tubular portion at the other end thereof, said tubular socket portion and said first retaining ring being flexible and each presenting a continuous wall to the other, a stud assembly having a head section overlying a surface of the other of said panels, a shank extending from said head section through the aperture formed in said panel and a second retaining ring disposed about said shank adjacent said head, an enlarged portion on said shank being in snapped engagement with the tubular portion of said socket to secure said panels one to the other said external shoulder of said tubular portion of said socket having surfaces spaced from said head section of said socket in abutting relation with each of said retaining rings in normal engaged position of said fastener and one of said surfaces including a portion for engagement with the first retaining ring whereby said retaining rings are forced against opposed surfaces of said panels thereby maintaining said installation.

References Cited by the Examiner

UNITED STATES PATENTS

| 769,807 | 9/04 | Stirckler | 24—213 |
|---|---|---|---|
| 930,961 | 8/09 | Hellwig | 24—216 |
| 1,176,619 | 3/16 | Sykes | 24—208 |
| 1,780,555 | 11/30 | Johnson | 24—208 |
| 2,327,164 | 8/43 | Book | 24—216 |
| 2,564,858 | 8/51 | Reiter | 24—213 |
| 2,933,793 | 4/60 | Steinberg | 24—208 |
| 3,049,777 | 8/62 | Lewin | 24—216 X |

FOREIGN PATENTS

| 218,338 | 11/57 | Australia. |
|---|---|---|
| 1,158,170 | 6/58 | France. |
| 117,961 | 2/01 | Germany. |

DONLEY J. STOCKING, *Primary Examiner.*

BERNARD A. GELAK, *Examiner.*